(12) United States Patent
De Luca

(10) Patent No.: US 10,046,983 B2
(45) Date of Patent: Aug. 14, 2018

(54) METHOD AND AUTOMATED COLLECTION SYSTEM FOR MARINE PLASTIC DEBRIS

(71) Applicant: Create Technologies, Inc., Carson City, NV (US)

(72) Inventor: Nicholas P. De Luca, Carmel-by-the-Sea, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 540 days.

(21) Appl. No.: 14/588,085

(22) Filed: Dec. 31, 2014

(65) Prior Publication Data
US 2016/0185618 A1 Jun. 30, 2016

(51) Int. Cl.
| | |
|---|---|
| *C02F 1/02* | (2006.01) |
| *C02F 1/40* | (2006.01) |
| *E02B 15/08* | (2006.01) |
| *E02B 15/10* | (2006.01) |
| *C02F 1/00* | (2006.01) |
| *C02F 101/30* | (2006.01) |
| *C02F 103/08* | (2006.01) |

(52) U.S. Cl.
CPC ............. *C02F 1/008* (2013.01); *C02F 1/02* (2013.01); *C02F 1/40* (2013.01); *E02B 15/08* (2013.01); *E02B 15/0857* (2013.01); *E02B 15/10* (2013.01); *C02F 2101/30* (2013.01); *C02F 2103/08* (2013.01); *C02F 2201/009* (2013.01); *C02F 2209/105* (2013.01); *Y02A 20/212* (2018.01)

(58) Field of Classification Search
CPC .... C02F 1/02; C02F 1/26; C02F 1/285; C02F 1/40; C02F 2201/009; C02F 2101/30; C02F 2101/32; C02F 2103/001; C02F 2103/08; C02F 2103/007; C02F 2303/24; C02F 1/008; C02F 2209/10; C02F 2209/105; B01D 15/02; E02B 15/00; E02B 15/08; E02B 15/0821; E02B 15/0828; E02B 15/0835; E02B 15/0842; E02B 15/085; E02B 15/0857; E02B 15/0885; E02B 15/0892; E02B 15/10; E02B 15/101
See application file for complete search history.

(56) References Cited

U.S. PATENT DOCUMENTS

| | | | |
|---|---|---|---|
| 2003/0010727 A1* | 1/2003 | Gunderson, III | ... E02B 15/0892 210/803 |
| 2010/0166397 A1 | 7/2010 | De Luca | |
| 2012/0146789 A1 | 6/2012 | De Luca et al. | |

OTHER PUBLICATIONS

"Solar Powered Soldering Station" by 'Solarcycle' from www.instructables.com (Feb. 2014).*

* cited by examiner

*Primary Examiner* — Lucas Stelling
(74) *Attorney, Agent, or Firm* — Capitol City TechLaw; Jasbir Singh

(57) ABSTRACT

A plastic debris collection system intended for marine use is disclosed. The system includes: a buoyant ring structure; various surface sheathings of plastic disposed on the buoyant ring structure and configured to be joined to a plastic debris; and a heating device disposed on the buoyant ring structure and configured to heat and join the plastic debris to one of the various surface sheathings of plastic.

20 Claims, 8 Drawing Sheets

Abundance (pieces km⁻²) by type and size of plastic pieces and tar found in the North Pacific gyre.

| Mesh-size (mm) | Fragments | Styrofoam pieces | Pellets | Polypropylene/ monofilament | Thin plastic films | Miscellaneous | | Total |
|---|---|---|---|---|---|---|---|---|
| | | | | | | Tar | Unidentified | |
| >4.760 | 1031 | 84 | 36 | 16811 | 5322 | 217 | 350 | 24764 |
| 4.759–2.800 | 4502 | 121 | 471 | 4839 | 9631 | 97 | 36 | 19696 |
| 2.799–1.000 | 61187 | 1803 | 12 | 9069 | 40022 | 833 | 72 | 114289 |
| 0.999–0.710 | 53780 | 591 | 0 | 2933 | 26273 | 278 | 48 | 85903 |
| 0.709–0.500 | 45106 | 567 | 12 | 1480 | 10572 | 121 | 0 | 57928 |
| 0.499–0.355 | 26888 | 338 | 0 | 845 | 3222 | 169 | 229 | 31692 |
| Total | 193494 | 3295 | 531 | 36857 | 95642 | 1714 | 736 | 334270 |

FIG. 5

| Mesh-Size (mm) - avg | Fragments Pieces | Weight per Fragment Piece (g) | Weight of Fragments (g)/sqkm | Styrofoam Pieces | Weight per Styrofoam Piece (g) | Weight of Styrofoam (g)/sqkm | Pellet Pieces | Weight per Pellet Piece (g) | Weight of Pellets (g)/sqkm |
|---|---|---|---|---|---|---|---|---|---|
| 4.76 | 1931 | 0.035914 | 69.350 |  |  |  | 36 | 0.056442 | 2.032 |
| 3.7795 | 4502 | 0.017978 | 80.938 | 84 | 0.002060 | 3.978 | 471 | 0.028254 | 13.308 |
| 1.8995 | 61187 | 0.002282 | 139.644 | 121 | 0.001031 | 4.643 | 12 | 0.003587 | 0.043 |
| 0.8545 | 55780 | 0.000208 | 11.589 | 1593 | 0.000131 | 8.010 | 0 | 0.000327 | 0.000 |
| 0.6045 | 45196 | 0.000074 | 3.325 | 591 | 0.000012 | 0.665 | 12 | 0.000116 | 0.001 |
| 0.427 | 26888 | 0.000026 | 0.697 | 567 | 0.000004 | 0.191 | 0 | 0.000041 | 0.000 |
|  |  |  |  | 338 | 0.000001 | 0.040 |  |  |  |
| Total/sqkm | 195484 |  | 305.54 | 3294 |  | 17.53 | 531 |  | 15.38 |

| Mesh-Size (mm) - avg | PP Monofil Pieces | Weight per Monofil Piece (g) | Weight of Monofil (g)/sqkm | Thin Film Plastic Pieces | Weight per Thin Film Piece (g) | Weight of Thin Film (g)/sqkm |
|---|---|---|---|---|---|---|
| 4.76 | 16811 | 0.000037 | 0.628 | 5322 | 0.000566 | 3.015 |
| 3.7795 | 4839 | 0.000030 | 0.144 | 9631 | 0.000357 | 3.439 |
| 1.8995 | 9969 | 0.000015 | 0.149 | 40622 | 0.000090 | 3.664 |
| 0.8545 | 2933 | 0.000007 | 0.020 | 26273 | 0.000018 | 0.480 |
| 0.6045 | 1460 | 0.000005 | 0.007 | 10572 | 0.000009 | 0.097 |
| 0.427 | 845 | 0.000003 | 0.003 | 3222 | 0.000005 | 0.015 |
| Total/sqkm | 36857 |  | 0.95 | 95642 |  | 10.71 |

METHOD AND AUTOMATED COLLECTION SYSTEM FOR MARINE PLASTIC DEBRIS

BACKGROUND

According to the United States Environmental Protection Agency, in the US alone in 2012, 32 million tons of plastics were produced; 12.7% of the total world production of 251 million tons. In the US, about half (14 million tons) of the plastic was used for containers and packaging, 11 million tons was used for durable goods, and about 7 million tons for non-durable goods such as plates and cups. Of all the plastic only about 12 percent was recycled.

The concentration of plastics in the oceans has increased tremendously in the last 50 years as the overall waste level of plastic has increased from less than 1% to almost 13% of the waste stream. According to studies by the Five Gyres Institute in Los Angeles and as reported by the Washington Post on Dec. 10, 2014, there are now 5 trillion pieces of plastic floating in the ocean weighing more than 250,000 tons. Rather than evenly dispersing in the oceans, plastics tend to concentrate in the northern and southern gyres; the northern pacific gyre forms what some call the "Great Pacific Garbage Patch". Current estimates of the total size of the region ranges from 700,000 square kilometers (270,000 square miles—about the size of Texas) to more than 15,000,000 square kilometers (5,800,000 square miles); in other terms, 0.41% to 8.1% of the size of the Pacific Ocean. It has been estimated that 46,000 pieces of plastic exist within each square mile of the patch. Further, unlike organic debris, plastic tends to disintegrate into smaller and smaller units of the polymer until the molecular level is reached. The ingestion of the plastic particles by animals including fish and birds occurs at high rates in these regions. One 1996 study by Dr. Theo Colborn showed plastics in 97.6% of albatross chicks while others argue that the plastic and the associated leached chemicals have further entered the food chain as a result of the breakdown in the ocean. While the overall health effects have been debated, the concentrations of harmful chemicals seem to increase tremendously when in contact with plastics. Dr. Markus Erikson of the 5 gyres group in Southern California states, "Pollutants like PCBs, DDT, flame retardants, pesticides, and other hydrophobic persistent organic pollutants can stick to plastic particles at high concentrations—up to a million times higher concentration than the seawater around them." Eventually, these chemicals then find their way to fish and then to humans.

Unfortunately, collecting said debris is a very difficult task for various reasons. Firstly, the tremendous size of the area that needs to be searched is extremely vast and the relative size of the debris to the size of the ocean is very small. Further, the use of large ships to collect the debris requiring personnel, fuel, supplies, and maintenance is expensive and not economical. In addition, marine environments are corrosive and rough and therefore collection and recycling systems that are too complex or require significant infrastructure have a high probability of malfunctioning or being damaged. Also, plastic and other organic material such as algae can be difficult to distinguish between each other. In addition, the use of a material such as wire or plastic thread or netting to collect the waste and bundle it together creates additional waste, maintenance, restocking, and cost issues.

The major thermoplastic resins used are polyethylene (low density, linear low density, and high density), polypropylene, polyethylene terephthalate, polystyrene, and polyvinyl chloride. According to the Plastics Europe Market Research Group, in Europe plastic demand by resin type can be divide as follows:

Polyethylene (low density, linear low density, high density)—29%
Polypropylene—19%
Polyethylene terephthalate—6.5%
Polystyrene—7.5%
Polyvinyl chloride—11%
Polyurethane (which is a thermoset plastic)—7%
Other—20%

In Europe almost 40% of this is concentrated in packaging uses primarily with Polyethylene and Polyethylene terephthalate (PET). In the US, approximately 25% PET use is for containers such as soda bottles (estimated to be 2.75 million tons as reported by Plastics News).

Without limitation, at sea, the plastic debris can be divided into several primary categories; mega debris (>100 mm), macro-debris (>20 mm in diameter, meso-debris (5-20 mm), and micro-debris (<5 mm). (Ryan P. G., Moore C. J., van Franeker J. A., Moloney C. L. 2009, "Monitoring the abundance of plastic debris in the marine environment", Phil. Trans. R. Soc. B 364, 1999-2012. (doi:10.1098/rstb.2008.0207).) Typically 40-80% of the mega and macro debris are plastic. (Derraik J. G. B. 2002, "The pollution of the marine environment by plastic debris: a review", Mar. Pollut. Bull. 44, 842-852. (doi:10.1016/S0025-326X(02)00220-5).) Moore et al report in a 2001 study that the distribution of plastic in the Northern Pacific Gyre were as illustrated in FIG. 6.

Without limitation, the table above can be converted to a weight allocation (assuming a spherical pellet, flat film of 0.025 mm thickness and square, Styrofoam as a sphere with density of 0.0000365 g/mm$^3$, pellets and film of density 0.001 g/mm$^3$, fragments being ⅓ the volume of a cube, and filaments with a diameter of 0.1 mm) as illustrated in FIG. 6.

Without limitation, as shown by the shaded cells, the larger items contain the greatest weight distribution of plastic waste and it could be argued are the most important to remove as they breakdown into the greatest number of smaller particles over time.

The energy required and temperature required to reform plastic and fuse it to another piece is a function of the type of plastic. Without limitation, below are typical values:

Polyethylene (low density, linear low density, high density): Heat-Sealing Temperature 105-204 Degrees C., Specific Heat J/K-kg 1900-2300
Polypropylene: Heat-Sealing Temperature 140-205 Degrees C., Specific Heat J/K-kg 1700-1900
Polyethylene terephthalate: Heat-Sealing Temperature 115-170 Degrees C., Specific Heat J/K-kg 1200-1350
Polystyrene: Heat-Sealing Temperature 50-95 Degrees C., Specific Heat J/K-kg 1200
Polyvinyl chloride: Heat-Sealing Temperature 50-75 Degrees C., Specific Heat J/K-kg 1000-1500

Without limitation, from the heat sealing temperatures and specific heat values above, the amount of energy required to bring the plastic in one square kilometer at 15 degrees Celsius to 150 degrees Celsius can be estimated at 350 g*0.001 kg/g*1500 J/k-kg*135 K=70,000 Joules.

In comparison, a 100 watt solar cell working for 5 hours per day at 10% efficiency would produce approximately: 100 W*3600 sec/hours*5 hours=180,000 joules.

In considering the chance that a piece of plastic floating in the ocean would make contact with another object one must consider the probability associated with the event. The surface area of the plastic in FIG. 6 can be extrapolated, without limitation, to the data of FIG. 7.

The largest surface area contributor as shown in Table 3 would be plastic film with an average mesh size of 1.89 mm$^2$. The total surface area of the material described by Moore et al. would appear to comprise approximately 2.25 square meters/square kilometer or about 0.0002% of the ocean surface in the gyres. If considering the weight approximations and claims that 250,000 tons of plastic are at sea, these surface area values could be increased by as much as 100 times; therefore bringing the surface area value to range from 0.0002%-0.02% of the Pacific's surface area. According to the American Meteorological Society, Pacific Ocean currents range from 3-4 km/hour.

Without limitation, in considering the chance that a piece of floating plastic in a current will intercept the path of a collection device also in the current and is not powered, similar probability functions to those used to determine space debris collisions should be considered although not done in depth in this disclosure. Salvatore Alfano describes an approach to determining this in space "A Numerical Implementation of Spherical Object Collision Probability" in The Journal of Astronautical Sciences. Based on Table 2 approximately 250,000 pieces of plastic per square kilometer account for the largest amount of debris by weight; thus, if distributed evenly, each particle would exist in a 4 square meter zone or a two meter by two meter area. If the particle is located at the center of its 2 meter by 2 meter area, a mean radius of 1 meter would exist for each particle or 2 meters between particles. Assuming a minimum 1% deviation from the primary current of 3-4 km/hr, the plastic particles would move approximately 0.0083-0.011 msec relative to each other or another object in the current. Any collection system that is primarily passive in the manner in which it moves needs to be sized in order to account for the particle distribution and the chance that a plastic particle's path will intersect with the collection system.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A plastic debris collection system intended for marine use is disclosed. The system includes: a buoyant ring structure; various surface sheathings of plastic disposed on the buoyant ring structure and configured to be joined to a plastic debris; and a heating device disposed on the buoyant ring structure and configured to heat and join the plastic debris to one of the various surface sheathings of plastic.

A process for the collection of plastic debris from marine environments is disclosed. The process includes: determining a type for the plastic debris using images from a camera and a computer system; collecting the plastic debris; and joining the plastic debris to a primary waste ring.

Additional features will be set forth in the description that follows, and in part will be apparent from the description, or may be learned by practice of what is described.

FIGURES

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

The invention will now be described more fully in connection with the following drawings:

FIG. 1 illustrates an isometric view of a ring plastic debris collector, according to various embodiments.

FIG. 2 illustrates the ring of FIG. 1 with collected debris.

FIGS. 3a, 3b, 3c, and 3d illustrate close up two dimensional views of various exterior multiple plastic segmented surfaces for fusing with debris, according to various embodiments.

FIG. 4 illustrates a flow chart of the control process used to collect debris, according to various embodiments.

FIG. 5 illustrates the distribution of plastic in the Northern Pacific.

FIG. 6 illustrates a weight allocation.

Figure 7:
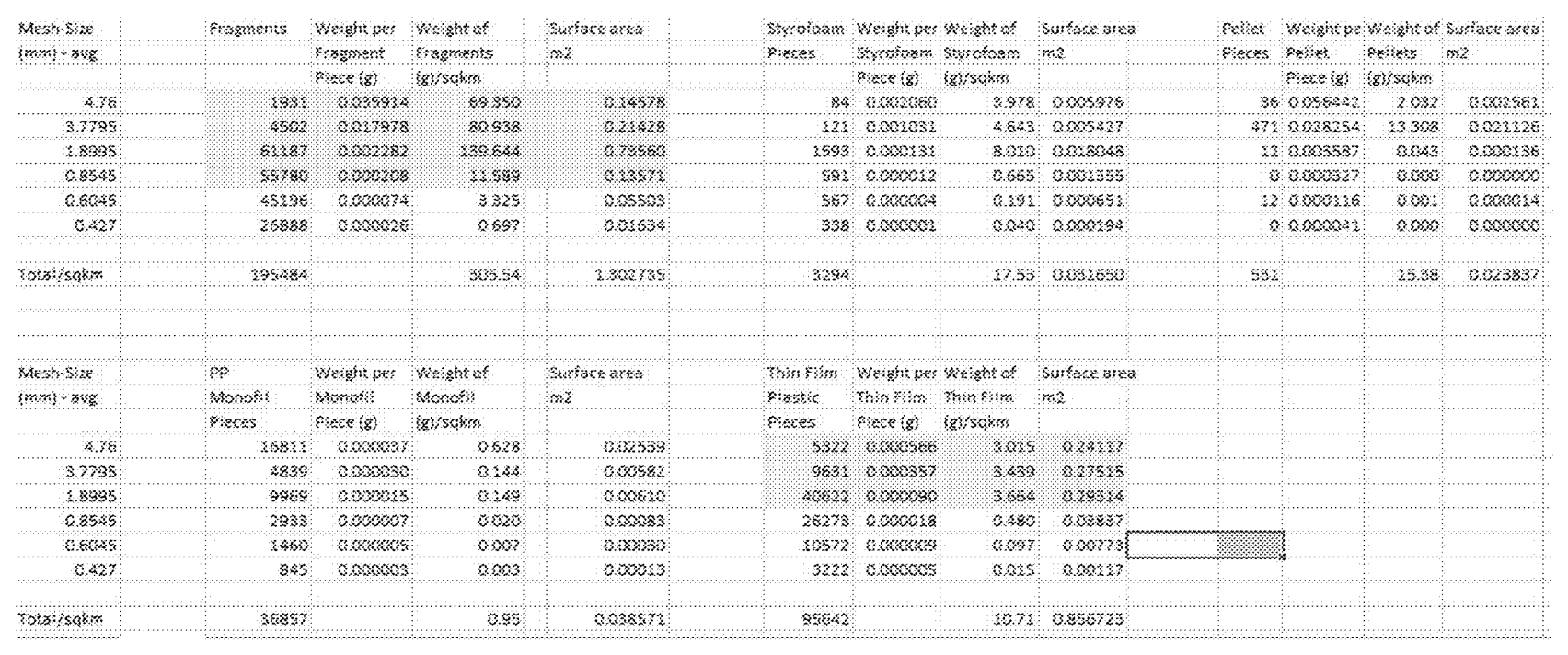

FIG. 7 illustrates an extrapolated FIG. 6 including a surface area of a plastic.

DESCRIPTION OF DRAWINGS

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

A system for the collection of plastic refuse that is floating in marine environments is described. The system forms large fused conglomerations of plastic that can be tracked by satellite or other electronic means, and collected by boat. The system incorporates a small floating ring that may or may not propel itself in water, a fuser to fuse together or join the plastic debris to a portion of the ring, a driving system to move the fuser with respect to the plastic debris being collected, a ring (for example, a prefabricated plastic ring formed by combining different types of plastic surfaces, means to continuously form a layered surface of collected and fused plastic for the fuser to ride on, computerized visual systems for plastic identification, sorting means, and a power system.

Figure 1:
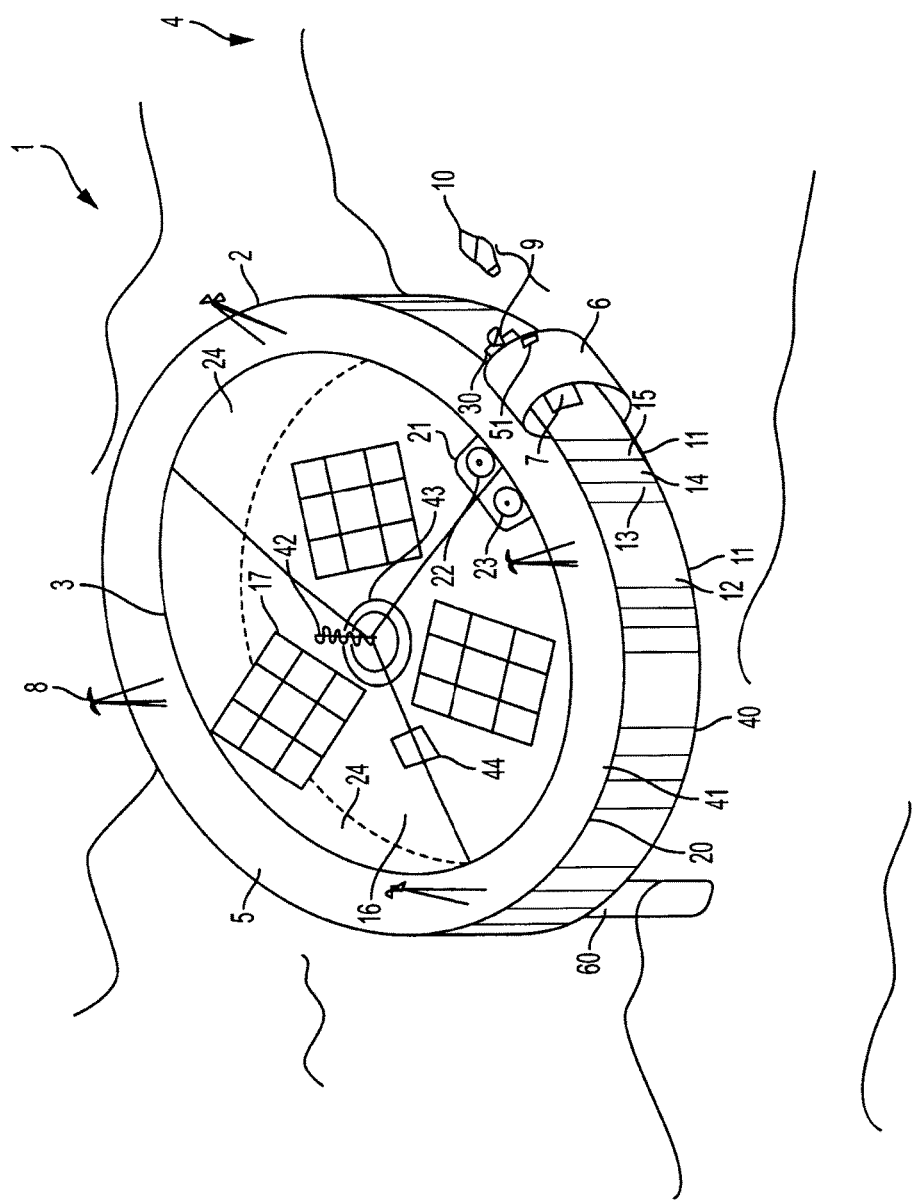

It is therefore a primary object of the disclosure to allow for the efficient and cost effective collection of plastic waste from waterways and the oceans.

It is also an object of the disclosure that the collection system be easily manufactured, inexpensive, and able to withstand the nature of marine environments for long periods of time.

According to various embodiments, the disclosed plastic collection system requires minimal maintenance and does not require restocking or refueling while in the ocean or in water ways.

According to various embodiments, the collection process does not require the use of additional materials or consumables such as netting to contain the plastic waste.

According to various embodiments, the collection system is able to distinguish plastic from organic material such as algae.

According to various embodiments, various types of the major plastics are easily collected.

Disclosed herein is a ring with a diameter generally greater than 2 meters with an outer waste collection surface and an inner structure intended to maintain buoyancy in water. The internal structure of the ring is made with an average density of less than 1 g/cc and further able to support the external collection surfaces, waste, mechanical and electronic subsystems. The outer surface of the ring is formed with interleaved and alternating sections of plastic made most frequently (based on their predominance in the waste stream) of polyethylene, polypropylene, polyethylene terephthalate, polystyrene, and polyvinyl chloride. Further, upon the external circumference of the ring, in some embodiments, a pressure wheel, vision system, and a heating system are disposed. For example, they ride in a manner capable of extension away from the center of the ring but connected to a drive system that is supported on the internal circumference of the ring. In the center of the ring, a solar panel is disposed/secured. In some embodiments, one or more of an electronic communication, vision, data, computer, drive system, and power system are disposed in the center of the ring.

To collect plastic debris from waterways and oceans, the ring is placed in the current upon activating the tracking device located on the ring. As the ring moves through the current, plastic debris randomly collides with the surface of the external circumference and detection of the event is achieved using a vision camera. The camera and algorithms further performing a color histogram and other visual analytics on the debris object to determine if the object is organic in nature and if possible, identify the object such as a bottle (most commonly made of polyethylene terephthalate) or a bag (commonly made of polyethylene). The heat sealer and pressure wheel then moves to the location of the collision via the drive motor located on the internal circumference, further engaging a portion (if large) or all the plastic, by crushing it and pressing it to the wheel. As the ring continues to turn with respect to the heat sealer and the secured object, the various plastic panels on the exterior made of different plastic come into contact with the debris object. If the debris type of plastic is unknown it will first be moved to the most common plastic plate for fusing and if fusing is determined to have not occurred under the temperatures provided for that material, the object is moved to a subsequent plastic region. This process continues until a joint is achieved. Over time, debris is accumulated and multiple layers of plastic debris combine and layer upon each other as and the mass of the ring grows until ready for efficient pickup and removal.

FIG. 1 illustrates a plastic debris collection ring 1 afloat in an ocean current 4. The plastic debris collection ring 1 includes outer surfaces 2, 40, and 41 that collect debris 10. Ring 1 is configured to float. According to various embodiments, ring 1 is formed to have a density of less than 1 g/cc. As examples, hollow, cellular, or inflatable structures may form the ring as well as solid structures made of materials that have a mean density of less than water. Ring 1 includes a heater 7 and a compression unit 30 in an assembly 6. Assembly 6 may move on a perimeter 20 on the outer surfaces 2, 40, and 41 via attachment to a motor system 21. The motor system 21 includes a motor 22 and gearing 23 riding on an inner surface 3 upon which, for example, a knurled surface or other suitable surface for the gearing 23 is used to engage the perimeter 20.

Surfaces 2, 40, and 41 may be located above and below the water. Surfaces 2, 40, and 41 may be lined in repeating sectional units 11 with subsections 12, 13, 14, 15 made of different plastic materials. The size of the subsections 12, 13, 14, 15 may correspond to a typical waste composition of plastic in the area. For example, as drawn, subsection 12 may be polyethylene, while subsections 13, 14, and 15 may be polyethylene terephthalate, polystyrene, and polyvinyl chloride respectively. These various materials may be joined to cover the surfaces 2, 40, and 41 in horizontal, vertical, circumferential, or randomly and further the size may be tailored to adjust for the debris size most likely to make surface contact. Additional extensions of surfaces 2, 40, and 41 may exist as plate 60 and extend partially or completely around 20 with assembly 6 adapted accordingly.

Assembly 6 allows debris fusion on upper and lower surfaces 41 and 40 as well as surface 2 on the ring 1. The compression unit 30 enabling for part or all of the engaged debris to be compressed but also to be held while being moved to an appropriate area for thermal sealing. In some embodiments, sealing may be performed with a heater 7, for example, an impulse type heater using a nichrome based heating element. A heater system similar to that disclosed by Nicholas P. De Luca in US Patent Publication No. 2010/0166397 which uses a stored energy system could also be employed and selectively turned on when contact between the debris and a suitable fusing surface has been selected of subsection 11. Vision camera 9 can be used to determine what plastic has been captured and can be further used in conjunction with sensor 51 to detect whether a successful seal with the debris has been made achieved.

Surface 16 extends over and covers or partially covers the central area of ring 1. According to various embodiments, surface 16 may support solar panels 17, auxiliary mechanical, electrical, energy storage equipment 44, communication antennae 42, computer systems 43, and cameras 8. Surface 41 may also include a support 5 to hold a camera 8. Camera 8 can be used to visually identify and track debris 10 as it approaches ring 1.

Figure 2:
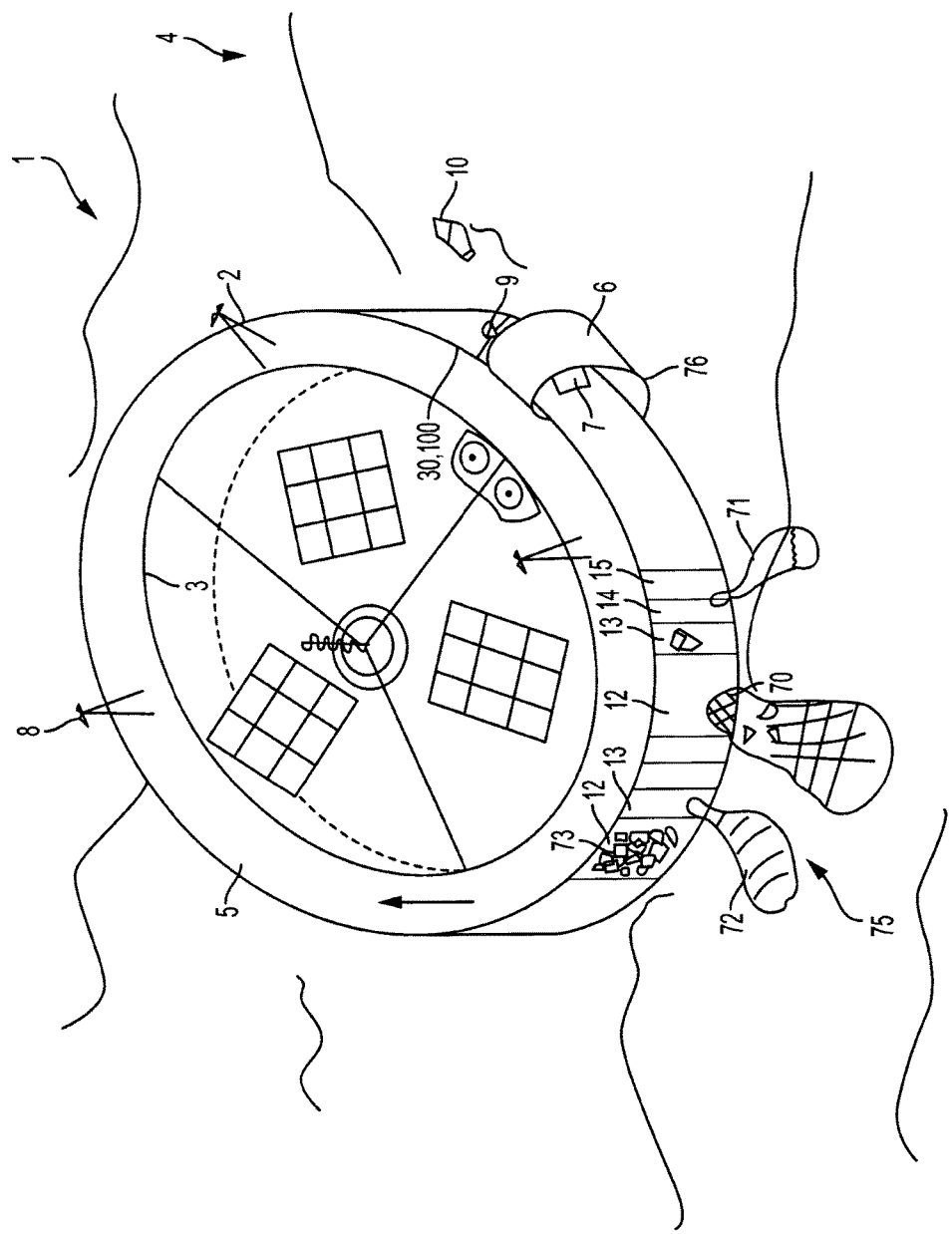
Figure 3B:
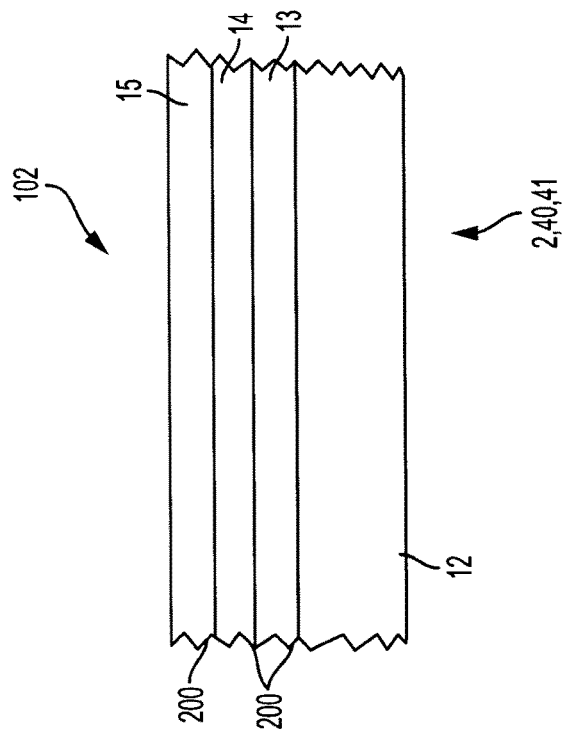
Figure 3A:
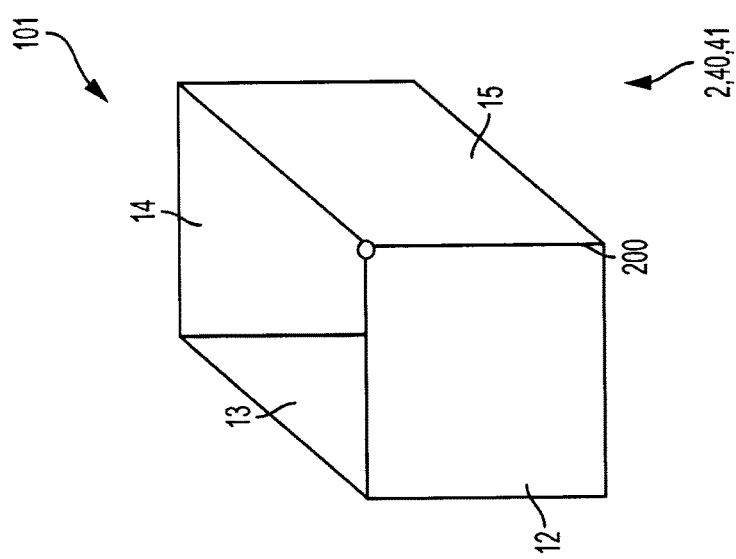
Figure 3D:
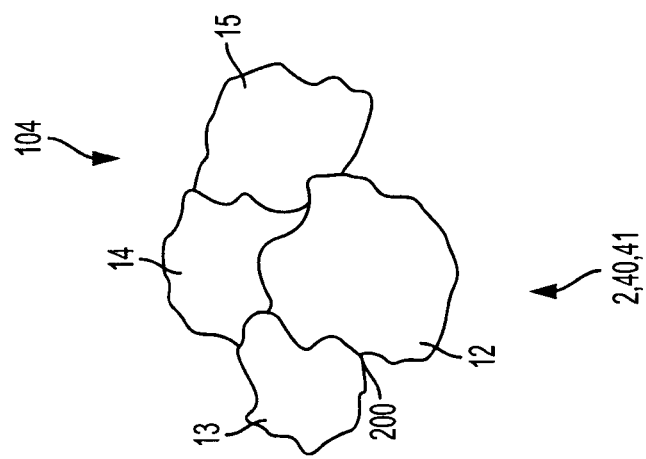
Figure 3C:
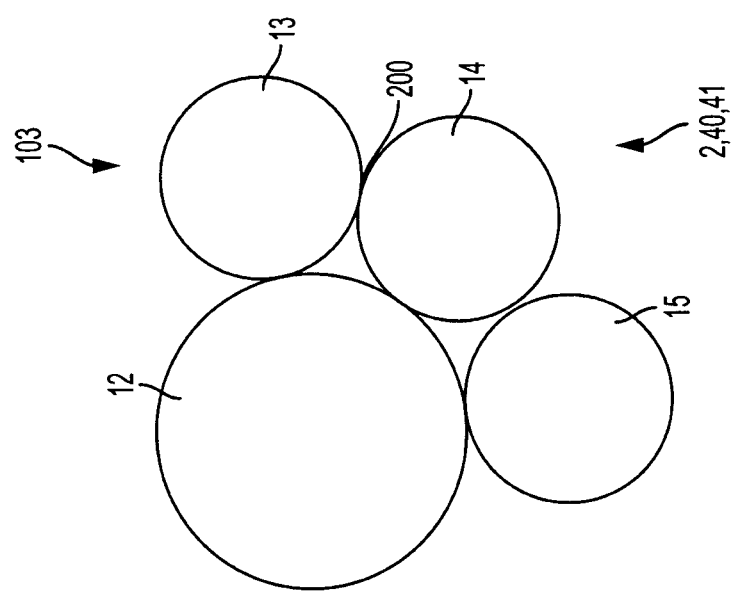

FIG. 2 illustrates the attachment of debris 75 to the ring 1 when in open waters 4. Fragments of polyethylene 73 and a polyethylene bag 70 are attached to substrate 11, while a bottle and filament made of polyethylene terephthalate is attached to section 13, and a piece of expanded polystyrene is attached to section 14. Compression unit 30 enabling the partial or total sealing of debris 75 to surface 2 and further adjusting the position of the sealing and debris object 75. Camera 8 mounted on support 5 may assist in the determination process of the type of plastic encountered. The cameras 8 and 9 may potentially analyze the debris under magnification or under various lighting, such as, ultraviolet or infrared. The information collected by cameras 8 and 9 may be used to develop color histograms or other selection tools to determine the type of plastic. In some embodiments, compression unit 30 may include a separator 100 allowing for the removal of organic matter. The separator 100 may assist in separating debris 100, and the separated debris may be identified by performing a color histogram or other object characterization to determine whether the separated debris is organic in nature.

FIGS. 3a, 3b, 3c, 3d illustrate the manner in which surfaces 2, 40, and 41 may be "tiled" or formed to create a multi typed plastic substrate for fusing debris. Patterns 101, 102, 103, and 104 may be repeated over the entire fusing area at various angles or concentrations or size of one plastic versus another. Similarly to what is shown in FIGS. 1 and 2, sections 12, 13, 14, 15 in drawings 3a, 3b, 3c, and 3d represent polyethylene, polyethylene terephthalate, polystyrene, and polyvinyl chloride respectively although these types could be modified or additional plastic types added. In some embodiments, co-extrusion with a binder polymer 200 may be performed to create the tile structure. In addition the tiling maybe formed of solid or foamed material with the debris attached forming a solid structure to continue with the layering process of additional plastic debris.

Figure 4:
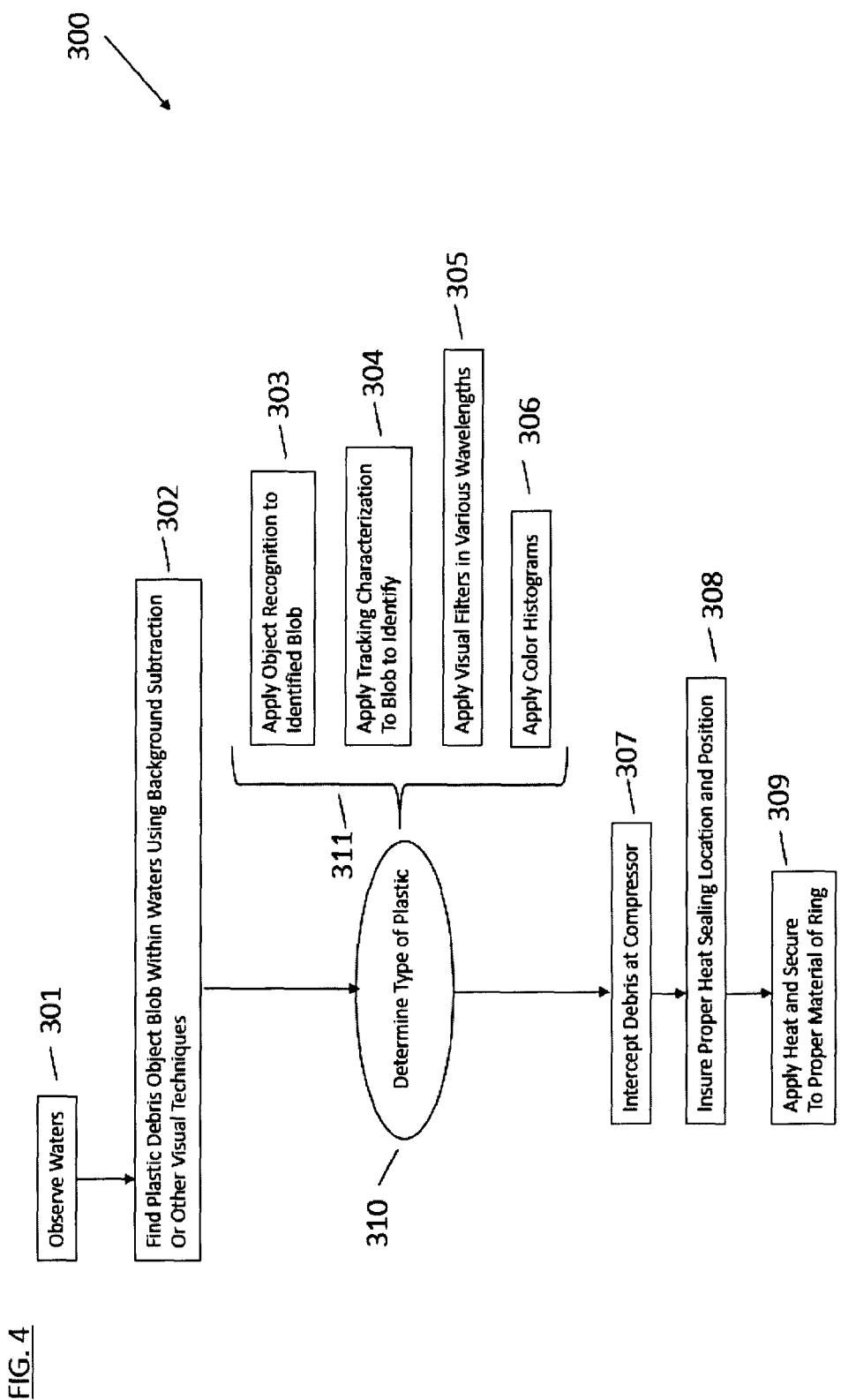

In FIG. 4 (FIGS. 1 and 2 are used by reference herein) process 300 is described by which the segmentation and combination of debris 10 to specific plastic material types on the collection ring (12, 13, 14, and 15) is disclosed. Specifically the cameras 8 and 9 shown in FIGS. 1 and 2 are used to collect data by observing the waters per operation 301. Process 300 further includes finding a plastic debris object blob within the waters using background subtraction or other visual techniques per operation 302. Background subtraction or other visual techniques may be performed per De Luca et. al. US Patent Publication No. 2012/0146789 A1, incorporated herein in its entirety. The characterization of the debris in operation 311 can be accomplished by applying one or more of multiple techniques. The multiple techniques may include applying object recognition techniques per operation 303; using the velocity information obtained using tracking information per operation 304; applying visual filters at various wavelengths per operation 305, including the use of infrared, ultraviolet, and visible light; and applying adjusted filter histograms per operation 306 to make a determination regarding the type of plastic used to form the debris per operation 310. Once this information has been assessed per operation 310, appropriate electronic signals can be sent to the motor 21 (such as, a stepper motor signal) such that the compressor 30 can approach the waste plastic 10 and insure the proper heat sealing to the appropriate plastic at the appropriate location upon ring 1 is performed per operations 308 and 309.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

I claim:

1. A plastic debris collection system intended for marine use comprising:
    a buoyant ring structure;
    various surface sheathings of different plastics disposed on the buoyant ring structure and configured to be joined to a plastic debris; and
    a heating device mounted to the buoyant ring structure and configured to heat and join the plastic debris to one of the various surface sheathings of different plastics.

2. The plastic debris collection system of claim 1, wherein the buoyant ring structure is generally circular in shape.

3. The plastic debris collection system of claim 1, wherein the various surface sheathings of different plastics are configured for fusion to one or more types of plastic.

4. The plastic debris collection system of claim 1, wherein the plastic debris comprises one or more of a polyethylene, polyethylene terephthalate, polypropylene, polystyrene, or polyvinyl chloride type of plastic.

5. The plastic debris collection system of claim 1, wherein the various surface sheathings of different plastics are formed in multiple exposed adjoining layers or subsections having a circular, random, or polygonal shape.

6. The plastic debris collection system of claim 1, wherein the heating device comprises a stored energy heater.

7. The plastic debris collection system of claim 1, wherein the heating device comprises a stored energy heating device.

8. The plastic debris collection system of claim 1, further comprising a solar panel to energize the heating device.

9. The plastic debris collection system of claim 1 wherein the ring size is greater than 2 meters in diameter.

10. The plastic debris collection system of claim 1, wherein the heating device comprises an impulse stored energy heating system.

11. A process for the collection of plastic debris from ocean environments comprising:
    providing a debris collection system comprising
        a buoyant ring structure;
        various surface sheathings of different plastic disposed on the buoyant ring structure and configured to be joined to a plastic debris; and
        a heating device mounted to the buoyant ring structure and configured to heat and join the plastic debris to one of the various sheathings of different plastics;
    determining a type for the plastic debris using images from a camera and a computer system;
    collecting the plastic debris; and
    joining the plastic debris to the debris collection system by heating the plastic debris with the heating device.

12. The process of claim 11, further comprising differentiating the plastic debris from a surrounding water.

13. The process of claim 12, wherein the differentiating comprises performing a background subtraction technique.

14. The process of claim 12, further comprising identifying a plastic type of the plastic debris using one or more of an object recognition, a tracking movement, visual filters at various wavelength, and a color histogram analysis technique.

15. The process of claim 11, further comprising tracking the plastic debris so as to allow for the proper joining of the plastic debris to a portion of a ring shell plastic having a plastic type similar to the plastic type of the plastic debris.

16. The process of claim 11 wherein the joining comprises heating the plastic debris or a ring using an impulse stored energy heating system.

17. A plastic debris collection system intended for marine use comprising:
    a buoyant ring structure;
    various surface sheathings of different plastics disposed on the buoyant ring structure and configured to be joined to a plastic debris;
    a heating device disposed on the buoyant ring structure and configured to heat and join the plastic debris to one of the various surface sheathings of different plastics;
    a camera to capture an image of the plastic debris; and
    a computer system to determine a type for the plastic debris using the image.

18. The plastic debris collection system of claim 17, wherein the computer system determines the type of the plastic debris using of one or more of an object recognition, a tracking movement, visual filters at various wavelength, and a color histogram analysis technique.

19. The plastic debris collection system of claim 17, wherein the computer system differentiates the plastic debris from a surrounding water.

20. The plastic debris collection system of claim 17, further comprising a compression unit to allow for the proper joining of the plastic debris to a portion of the ring shell plastic having a plastic type similar to the determined plastic type of the plastic debris.

\* \* \* \* \*